United States Patent [19]
Iwao

[11] Patent Number: 5,461,498
[45] Date of Patent: Oct. 24, 1995

[54] LIGHT SCANNING DEVICE

[75] Inventor: Naoto Iwao, Nagoya, Japan

[73] Assignee: Brother Kogyo Kabushiki Kaisha, Nagoya, Japan

[21] Appl. No.: 239,879

[22] Filed: May 9, 1994

[30] Foreign Application Priority Data

| May 26, 1993 | [JP] | Japan | 5-123861 |
| Jul. 7, 1993 | [JP] | Japan | 5-167691 |
| Sep. 3, 1993 | [JP] | Japan | 5-220214 |

[51] Int. Cl.$^6$ .................................................. G02B 26/08
[52] U.S. Cl. ..................... 359/200; 359/198; 359/212; 359/216; 359/226; 384/226
[58] Field of Search .................................. 359/198, 199, 359/200, 226, 196, 197, 224, 225, 216; 384/91, 153, 193, 226, 227, 99, 450; 310/40 R, 46, 68 B, 68 E, 750, 90, 90.5

[56] References Cited

U.S. PATENT DOCUMENTS

| 4,512,626 | 4/1985 | Kamiya et al. | 359/200 |
| 5,069,515 | 12/1991 | Itami et al. | 359/216 |
| 5,173,797 | 12/1992 | Zedekar et al. | 359/216 |
| 5,254,893 | 10/1993 | Ide | 310/90 |

FOREIGN PATENT DOCUMENTS 61-143715  7/1986  Japan.

*Primary Examiner*—Paul M. Dzierzynski
*Assistant Examiner*—Darren E. Schuberg
*Attorney, Agent, or Firm*—Oliff & Berridge

[57] ABSTRACT

In a preferred mode of a light scanning device, a reflection mirror is designed in an inverted cup-shaped form and has a hexahedral means portion at the outer side thereof and a bearing at the bottom portion thereof. The bearing includes a pivot receiving portion and a damping portion. The pivot is erectly provided on the rotational center axis of the reflection mirror such that it is not rotated. The upper end of the pivot rotatably supports the pivot receiving portion, so that the reflection mirror is rotatably supported by the housing. A motor for rotating the reflection mirror is disposed at the inner side of the reflection mirror. However, other structures are possible that result in a resonance rotating number that is approximately one-third of the operational rotating number.

20 Claims, 3 Drawing Sheets

LIGHT SCANNING DEVICE

BACKGROUND OF THE INVENTION

1. Field of the Invention

This invention relates to a light scanning device for conducting deflection control of the light beam of a laser beam in accordance with an image signal in a electrophotographic type of recording device or the like in which a print operation is carried out at a high speed in accordance with an image signal transmitted from a computer, and more particularly to a bearing device of the light scanning device.

2. Description of Related Art

An electrophotographic type of recording device, for example, a laser beam printer, has been recently widely used as a recording device for recording image information from a computer. In general, the recording device includes a light scanning device, such as disclosed in U.S. Pat. Nos. 5,151,586 and 5,274,398, for conducting a deflection control of a light beam in accordance with image information to sweep the light beam on a photosensitive medium, a charging device for charging the photosensitive medium, a developing device for developing a latent image which is formed on the photosensitive medium by the light beam, and a transfer and fixing device for transferring and fixing the image developed by the developing device onto a recording medium, such as a sheet.

The light scanning device used in the electrophotographic type of recording device includes a reflection mirror, a bearing for rotatably supporting a rotational shaft of the reflection mirror, and a motor which is connected to the rotational shaft of the reflection mirror to rotationally drive the rotational shaft. The motor rotates the reflection mirror at about several thousands to ten thousand rpm to thereby carry out the deflection scanning of the light beam incident to the mirror surface of the reflection mirror.

It has been generally known that a rotor has two types of resonance modes which are called a cylindrical mode and a conical mode in which the rotational shaft of the rotor is whirled. The resonance rotating numbers (resonance frequencies) of both of the resonance modes as described above are determined by the mass of the rotor and the rigidity (stiffness) of a bearing for supporting the rotational shaft. Both of the resonance rotating numbers are increased as the mass of the rotor is decreased or the stiffness of the bearing is increased.

In the conventional light scanning device, the rotating number of the reflection mirror serving as the rotor is not very high and the following method has been adopted. That is, by supporting the rotational shaft of the reflection mirror through a large-size rigid bearing having high stiffness, the resonance rotating numbers of both of the resonance modes are increased, and by setting the operational rotating number (stationary rotating number) to be sufficiently lower than the resonance rotating numbers of both of the resonance modes, the whirl of the rotational shaft of the reflection mirror can be forcedly suppressed without considering the effect on the resonance modes.

However, in the light scanning device used in the conventional electrophotographic type of recording device, if adjustment of the dynamic balance of the reflection mirror or the positioning between the rotational shaft of the reflection mirror and the rotational center axis of the bearing is not performed with sufficiently high precision, the whirl of the rotational shaft of the reflection mirror occurs due to failure of the dynamic balance or the deviation (off-line) of the rotational center axis, resulting in a problem that the imaging position of the light beam which is scanned on the photosensitive medium is positionally deviated.

Further, the output speed of the recording device as described above must now be additionally increased and, thus, the rotational speed of the reflection mirror is required to be further increased to about 16,000 rpm. Accordingly, in the conventional light scanning device, when the rotating number of the rotor approaches the resonance rotating number, vibration amplitude of the rotational shaft is intensified due to the resonance phenomenon, so that degradation in performance, noise and a shortening of the lifetime occur. In some cases the device suffers instantaneous destruction.

In order to avoid the above problems, the conventional light scanning device is so designed that the resonance rotating number is sufficiently higher than the operational rotating number. Specifically, large pressurization is given for the ball bearing and a small gap is provided between a shaft portion and the bearing for a fluid bearing, that is, in both cases, the resonance rotating number is increased by increasing the bearing stiffness. Therefore, such a method induces a problem that the bearing resistance is increased when the pressurization of the bearing is increased and, thus, a large output is required for a driving circuit. A resulting problem is that the lifetime of the bearing is necessarily shortened. Further, the design of the small gap for the fluid bearing requires extremely high precision mechanical processing, thereby increasing the cost of the device.

SUMMARY OF THE INVENTION

An object of the invention is to provide a light scanning device in which a reflection mirror can be easily prevented from cylindrical or conical whirl around the rotation axis or wobbling (designated as whirling in future references) when it is rotated at high speed to thereby prevent leakage of vibration to the outside.

In order to attain the above object, the light scanning device according to the invention includes a reflection mirror for reflecting a light beam which is modulated in accordance with image information, a bearing device for rotatably supporting the rotational shaft of the reflection mirror, and a driving device for conducting a scanning operation of radially reflecting the light beam from the reflection mirror by rotationally driving the reflection mirror, wherein the bearing stiffness of the bearing device is set to such a value that the resonance rotating number of a whirl resonance mode of the rotational shaft of the reflection mirror is sufficiently lower than the stationary rotating number of the reflection mirror.

The light scanning device as described above may further include at least one pivot bearing as the bearing device for rotatably supporting the rotational shaft of the reflection mirror and a damper for a translational motion of the bearing device in a direction perpendicular to the rotational shaft of the reflection mirror.

The reflection mirror may be designed in an inverted cup-shaped form and a pivot bearing may be provided to the ceiling portion of the reflection mirror.

According to the light scanning device thus structured, as the resonance rotating number of the two types of resonance modes of the rotational shaft of the reflection mirror is sufficiently lower than the stationary rotating number of the reflection mirror, the device suffers no affection of these resonance modes and, thus, the reflection mirror can be stably rotated. In addition, vibration due to whirl of the rotational shaft is prevented from leaking to the outside.

BRIEF DESCRIPTION OF THE DRAWINGS

The invention will be described with reference to the drawings, in which.

DETAILED DESCRIPTION OF THE PREFERRED EMBODIMENTS

Preferred embodiments according to the invention will be described hereunder with reference to the accompanying drawings.

Figure 1:
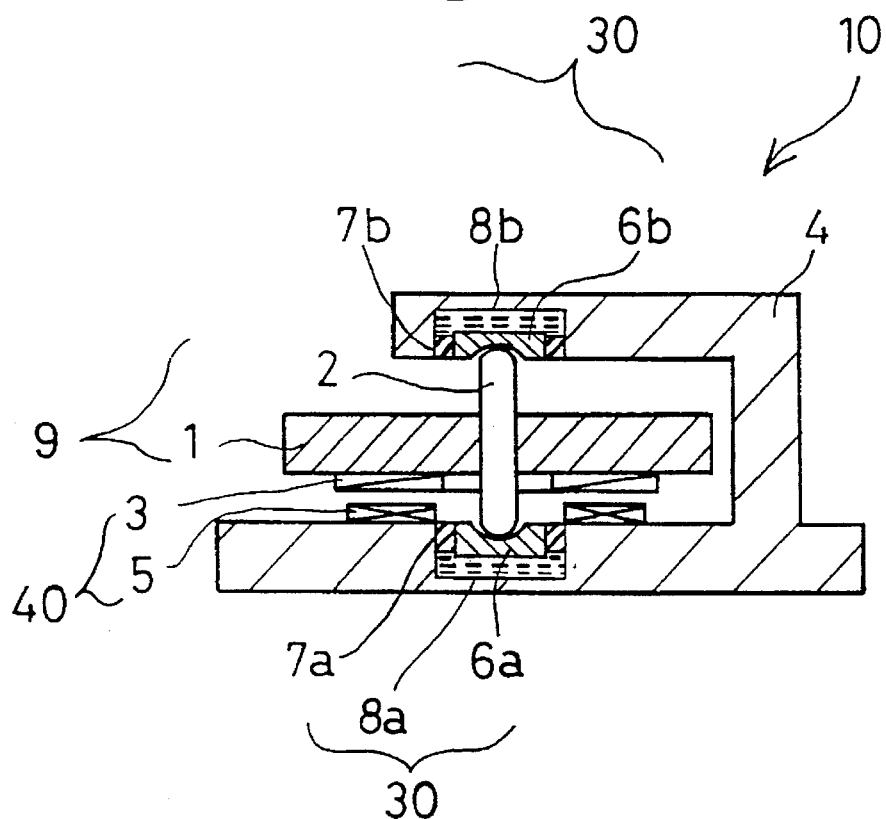
FIG. 1 is a schematic diagram showing the structure of a light scanning device of a first embodiment according to the invention.

In FIG. 1, a light scanning device 10 comprises a rotor 9, a bearing device 30, and a motor 40. The rotor 9 comprises a polygonal mirror 1 serving as a reflection mirror and a shaft member 2 which is linked to the center axis of the rotor 9. A permanent magnet 3 of the motor 40, serving as a driving device, is adhesively fixed to the bottom surface of the polygonal mirror 1.

The bearing device 30 comprises pivot bearings 6a and 6b which are formed of well-known bearing material, ring-shaped elastic members 7a and 7b formed of rubber, and dampers 8a and 8b which are formed of a grease material having a high viscosity. Both ends of the shaft member 2 are restrained by the pivot bearings 6a and 6b. The pivot bearings 6a and 6b are supported by a shaft frame 4 through the ring-shaped elastic members 7a and 7b at the side surface thereof and through the dampers 8a and 8b.

Each end of the shaft member 2 is processed to a hemispherical shape or a partial spherical shape. The shaft member 2 is rotatably supported by the pivot bearings 6a and 6b using an elastic force imparted by the shaft frame 4. A stator coil 5 of the motor 40 is disposed on the shaft frame 4 at a confronting position to the permanent magnet 3. The shaft frame 4 also has the stator yoke function.

The resonance rotating number of the rotor 9 is determined by the shape and mass of the rotor 9 and the bearing stiffness of the bearing device 30, and its value can be set to any value over a wide range by properly selecting the elastic modulus of the ring-shaped elastic members 7a and 7b. In this embodiment, the bearing stiffness of the bearing device 30 is set to about 13 N/m. The value of this bearing stiffness belongs to a sufficiently low value in well-known bearings. Further, the shape and mass of the rotor 9 is so determined that the resonance rotating number is about 6,000 rpm, that is, it is set to a sufficiently low value below one-third of the operational rotating number (stationary rotating number) of 20,000 rpm.

In the light scanning device 10 thus structured, a light beam emitted from a light source (not shown) is irradiated onto a photosensitive drum (not shown).

Figure 2:
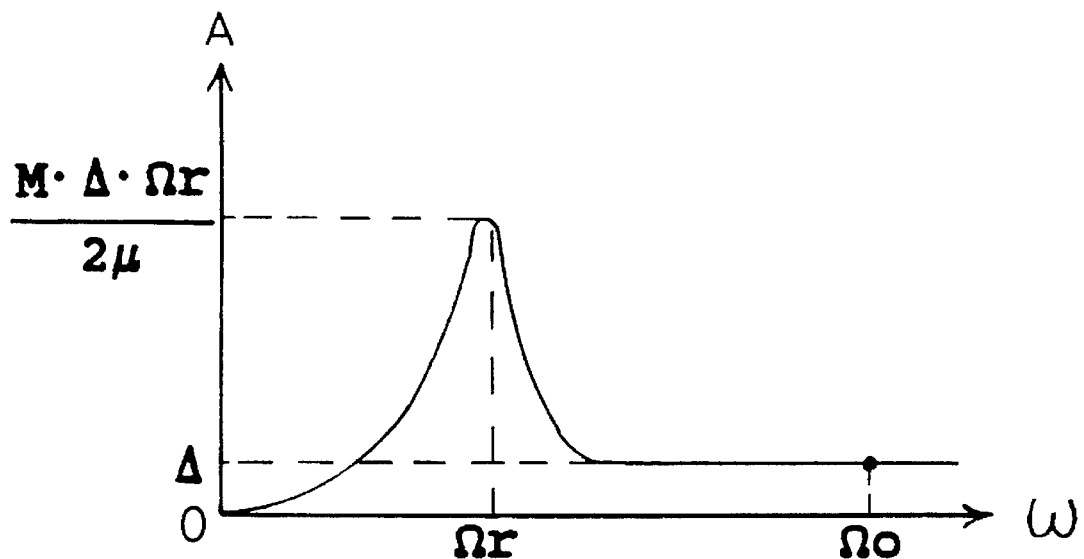
FIG. 2 is a schematic diagram showing the relationship between the rotational frequency of a rotor and the vibration amplitude of whirl.

The operation of the bearing device of the light scanning device thus structured will be described with reference to FIGS. 1 and 2. FIG. 2 shows the relationship between the rotational frequency and the whirl amplitude.

The rotational driving force is produced in the same manner as an ordinary motor and, thus, the detailed description thereof is omitted.

The rotational driving force is obtained by the stator coil 5 to which current is supplied from a well-known driving circuit and the permanent magnet 3. Just after the rotation is started, the center of the shaft member 2 serves as a rotational axis, and as the rotating number is increased, the shaft member suffers a vibrational motion as represented by the following equation:

$$M \cdot d^2z/dt^2 + 2\mu \cdot dz/dt + 2Sz = M \cdot \Delta \cdot \omega^2 \cdot \exp(i\omega t) \qquad (1)$$

$$z = x + iy$$

Here, (x,y) represents a position on a plane which is perpendicular to the axis of the shaft member 2, M represents the mass of the rotor 9, $\mu$ represents the resistance coefficient of the dampers 8a and 8b, S represents the bearing stiffness coefficient, and $\omega$ represents the rotational frequency of the rotor 9.

The first to third terms on the left side of the equation (1) represent inertia force of the rotor 9, resistance force due to translational motion of the bearing device 30 produced and restoring force of the bearing device 30 by the bearing stiffness S, respectively. The right side of the equation (1) represents centrifugal force due to eccentricity of the rotor 9.

As is well known, the solution of equation (1) is as follows:

$$A = \Delta \cdot \omega^2 \cdot \{(\Omega r^2 - \omega^2)^2 + (2\mu\omega/M)\}^{-0.5} \qquad (2)$$

$$\tan(\delta) = 2\mu\omega/\{M(\Omega r^2 - \omega^2)\} \qquad (3)$$

$$\Omega r = (2S/M)^{0.5}$$

Here, A represents the vibration amplitude of the shaft member 2, $\Omega$ represents a phase between the variation of the vibration of the shaft member 2 and the restoring force of the bearing device 30, and $\Omega r$ represents the resonance frequency of the resonance mode of the shaft member 2.

FIG. 2 schematically shows the equation (2). In FIG. 2, $\Omega o$ represents the rotational frequency at the stationary rotation time. From the equations (2) and (3), the vibration amplitude A of the shaft member 2 at the low-speed rotation speed just after the start of the rotation is as follows:

$$A = \Delta \cdot \omega^2/(2S) \qquad (4)$$

That is, the centrifugal force of $M \cdot \Delta \cdot \omega^2$ is equilibrated with the restoring force of 2Sz, and it is similar to the stationary case. As the rotating number is the resonance rotating number, $\tan(\delta) = \infty$, that is, $\delta = 90°$, and it is transferred to the resonance condition. At this time, only the resistance force of $2A\mu\Omega r$ applied by the dampers 8a and 8b is equilibrated with the centrifugal force of $M \cdot \Delta \cdot \omega^2$. Representing the vibration amplitude of the shaft member 2 in this resonance condition by Ar, $$A = Ar = M \cdot \Delta \cdot \Omega r/2\mu \qquad (5)$$

Further, as the rotating number is sufficiently increased, $$A = -\Delta \qquad (6)$$

the rotor 9 is rotated around the center of the inertia axis. Accordingly, even when the rotating number is further increased, the vibration amplitude A of the shaft member 2 is not increased until the rotating number reaches a rotating number range (ordinarily, above several hundred thousands rpm) in which the rotor 9 is required to be treated as an elastic member.

The above description is based on the self-balancing theory. The self-balancing theory is described in detail in Stanley Whitley "Review of the gas centrifuge until 1962. Part II" (Reviews of Modern Physics, Vol. 56, No. 1, January, 1984), the disclosure of which is herein incorporated by reference and the detailed description thereof is omitted.

Next, the operation when the light scanning device 1 using the bearing device 30 as described above as applied to a laser beam printer will be described with reference to FIGS. 1 and 2. Here, the laser beam printer used in this embodiment is well known and disclosed in U.S. Pat. No. 5,040,022, which is herein incorporated by reference.

A light source of the laser beam printer emits the light beam while turning the light beam on-and-off in accordance with the image signal, and the light beam is irradiated to a polygonal mirror 1 which is stably rotated around the center of the shaft member 2 at stationary rotating number as described above by the motor 40.

The light beam incident to the polygonal mirror 1 is reflected at high reflectivity. The reflected light beam is scanned in the substantially horizontal direction by the rotation of the rotor 9, and successively irradiated onto the photosensitive drum so that a latent image in accordance with the image signal is formed on the photosensitive drum charged by the charging device In this case, as described above in detail, since the phase difference between the variation of the vibration of the shaft member 2 of the rotor 9 and the restoring force of the bearing device 30 reaches 180°, the rotor is rotated with the true inertia axis at the rotational center, and thus the centrifugal force is equilibrated with the restoring force, so that the vibration amplitude of the shaft member 2 is suppressed to the degree corresponding to the eccentric amount of the rotor 9. Accordingly, the imaging position of the light beam which is scanned on the photosensitive drum does not deviate.

Thereafter, the latent image formed on the photosensitive drum is developed in a well-known electrophotographic process, and then it is transferred and fixed onto a sheet serving as a recording medium and outputted as a hard copy.

In this embodiment, both ends of the shaft member 2 are restrained by the pivot bearings 6a and 6b. The same effect can be obtained if only one end of the shaft member 2 is supported by the pivot bearing.

Next, another embodiment of the invention will be described with reference to FIGS. 2 and 3.

Figure 3:
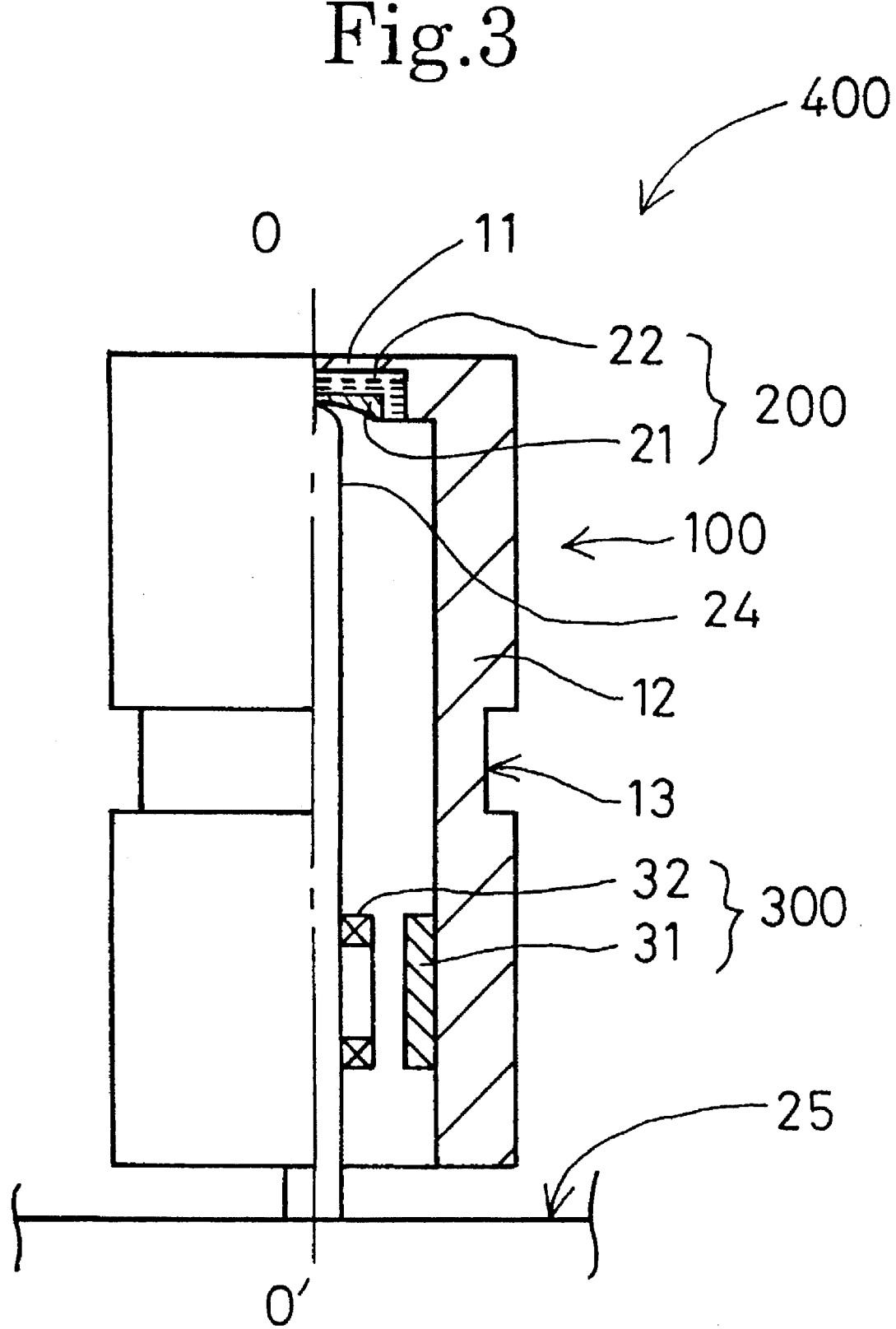
FIG. 3 is a schematic diagram showing the structure of a light scanning device of a second embodiment according to the invention.

In FIG. 3, a light scanning device 400 includes a reflection mirror 100, a bearing 200 for rotatably supporting the reflection mirror 100 on a pivot 24 which is located at the geometric center axis O—O', and a motor 300 for rotationally driving the reflection mirror 100.

The reflection mirror 100 is designed in an inverted cup-shaped form with a disc portion 11 located at the ceiling portion of the inverted cup-shaped reflection mirror 100 and a cylindrical portion 12 extending downwardly from the disc portion 11. A hexahedral mirror portion 13 is formed at a middle portion between the upper and lower ends of the outer portion of the cylindrical portion 12. A bearing 200 is formed at the middle portion at the inner side of the disc portion 11.

The bearing 200 comprises a pivot receiving portion 21 and a damping portion 22. The damping portion 22 serves as means for allowing over-run of a critical speed and as a viscosity damping element for the translational motion of the pivot receiving portion 21 in the direction perpendicular to the geometrical center axis O—O' of the reflection mirror 100 and is formed of a grease material, for example. The pivot 24 stands on the geometric center axis O—O' of the reflection mirror 100 and is not rotated. The upper end of the pivot 24 is processed to a hemispherical shape or a partial spherical shape so that the pivot receiving portion 21 is rotatably supported by the pivot 24. Further, the lower end of the pivot 24 is fixed to a housing 25 of the light scanning device, whereby the reflection mirror 100 is rotatably supported relative to the housing 25 of the light scanning device.

The motor 300 is disposed at the inner side of the reflection mirror 100. The motor 300 comprises a permanent magnet 31 disposed inside of the cylindrical portion 12 and a coil 32 which is disposed on the inner side surface of the pivot 24 which confronts the permanent magnet 31. The reflection mirror 100 is rotated by the interaction between the magnetic field caused by a current flowing in the coil 32 and magnetic field of the permanent magnet 31.

Here, a design embodiment of the inverted cup-shaped reflection mirror 100 will be described.

The inertia moment P along the rotational axis of an inverted cup-shaped rotor like the reflection mirror 100 and the inertia moment I along the axis which passes through the center of gravity and is perpendicular to the rotational axis are approximated in accordance with the following equation:

$$P = \pi \rho \{R^4(t+h) - r^4 h\}/2 \tag{1}$$

$$I = \pi \rho \{R^2 t h^2 + h(R^2 - r^2)(R^2 + r^2 + h^2/3)\} \tag{2}$$

Here, ρ represents density, R represents the outer diameter of the reflection mirror 100, r represents the inner diameter of the reflection mirror 100, h represents the height of the cylindrical portion 12, and t represents the thickness of the disc portion 11.

On the other hand, in order to design the reflection mirror 100 on the basis of the self-balancing theory as described above, both of the inertia moments P and I must satisfy the following inequality:

$$I > 3P \tag{3}$$

Here, if the dimensions of the respective elements of the reflection mirror 100 are set as follows: 20 mm in outer diameter, 12 mm in inner diameter, 3 mm in thickness of the disc portion 11, by substituting the equations (1) and (2) into the equation (3), it is understood that the height of the reflection mirror 100 may be set to 41 mm.

In the light scanning device 400 thus designed, a load applied to the pivot receiving portion 21 is substantially equal to the dead weight of the reflection mirror 100 itself. If the reflection mirror 100 is formed of aluminum, the dead weight of the reflection mirror 100 is a very light value of about 25 g. Therefore, the bearing stiffness of the bearing 200 which is substantially proportional to the load becomes a very small value of about 30 N/m. Accordingly, the resonance rotating number of the whirl of the reflection mirror 100 is reduced to about 6,000 rpm. As a result, the stationary rotational frequency Ωo at the stationary rotation time of the light scanning device 400 can be set to be sufficiently higher than the resonance frequency of the whirl of the reflection mirror 100.

Here, the operation of the light scanning device 400 thus constructed will be briefly described on the basis of the self-balancing theory with reference to FIGS. 2 and 3.

Before the light scanning device 400 starts its operation, the reflection mirror 100 is not rotated. In this condition, the coil 32 of the light scanning device 400 is supplied with a signal from the driving circuit, and a rotational driving force occurs in the permanent magnet 31 of the motor 30 so that the reflection mirror 100 is started to rotate by the driving force.

At the low-speed rotation time just after the start of the rotation, the centrifugal force due to the whirl of the center axis O—O' of the reflection mirror 100 is equilibrated with the restoring force due to elasticity of the bearing 200, and the amplitude of the whirl of the center axis O—O' of the reflection mirror 100 is increased in proportion to the square of the rotating number.

When the rotating number is increased to the resonance rotating number at which the rotational frequency ω is equal to the resonance frequency Ωr, the device is transferred to the resonance condition. At this time, the centrifugal force due to the whirl of the center axis O—O' of the reflection mirror 100 is equilibrated with the resistance force due to the damping portion 22, and the amplitude of the whirl of the center axis O—O' of the reflection mirror reaches its maximum value Ar.

When the rotational speed of the reflection mirror 100 is increased to such a rotating number that the rotational frequency ω is sufficiently high, the centrifugal force due to the whirl of the center axis O—O' of the reflection mirror 100 is equilibrated with the eccentricity of the reflection mirror 100, that is, with the centrifugal force due to the positional deviation between the geometrical center axis O—O' of the reflection mirror 100 and the inertia axis, so that the reflection mirror 100 is rotated around the inertia axis, and the amplitude of the whirl is reduced to the positional deviation amount between the geometrical center axis O—O' of the reflection mirror 100 and the inertia axis, that is, the eccentricity amount Δ of the reflection mirror 100. Accordingly, even if the rotating number is further increased, the vibration amplitude of the whirl of the center axis O—O' of the reflection mirror 100 is not increased until the rotating number reaches such a rotating number region that the reflection mirror 100 is required to be treated as elastic member (ordinarily, above several hundred thousands rpm).

As described above, if the bearing stiffness of the bearing 200 is set to such a value that the resonance frequency Ωr of the whirl of the center axis O—O' is sufficiently higher than the stationary rotational frequency Ωo at the stationary rotation time of the reflection mirror 100, preferably below one-third of the stationary rotational frequency Ωo, the amplitude of the whirl of the center axis O—O' of the reflection mirror 100 at the stationary rotation time of the reflection mirror 100 can be reduced to the same degree as the eccentricity amount Δ.

For example, if the bearing stiffness is set to about 30 N/m by the design as described above, the rotating number of the reflection mirror 100 at the whirl resonance time is about 6,000 rpm. Accordingly, assuming the stationary rotating number of the reflection mirror 100 to be 20,000 rpm, the whirl amplitude can be suppressed to a sufficient value which is the same degree as the eccentricity amount Δ of the reflection mirror 100.

In other words, when the rotating number of the reflection mirror 100 is coincident with the resonance rotating number of the whirl resonance mode of the reflection mirror 100, that is, when the rotating number is coincident with the critical rotating number, as described above, energy which is supplied through the centrifugal force caused by the eccentricity of the reflection mirror 100 is equilibrated with dissipation energy which is dissipated by the damping portion 22, so that the amplitude of the whirl of the reflection mirror 100 is little increased. When the rotating number of the reflection mirror 100 is further increased, as described above, the reflection mirror 100 is rotated around its inertia axis, and the amplitude of the whirl of the reflection mirror 100 becomes very small. As a result, the reflection mirror 100 is stably rotated at the rotating number corresponding to the predetermined stationary rotational frequency Ωo.

Accordingly, if the light scanning device 400 thus constructed is applied to the well-known laser beam printer like the first embodiment as described above, there occurs no deviation (off-line) of the imaging position of the light beam which is scanned on the photosensitive drum in a state where the reflection mirror 100 is stationarily rotated.

In this embodiment, using the damping portion 22 which is formed of grease material having high viscosity, the means of balancing the energy supplied through the centrifugal force due to the eccentricity of the reflection mirror 100 with the dissipation energy which is dissipated by the damping portion 22 is structured as the means for the over-run of the critical speed. However, the means for the over-run of the critical speed is not limited to the above structure, and it may be produced by another structure. For example, the whirl resonance frequency is varied by varying the bearing stiffness, thereby avoiding the critical speed.

Further, in this embodiment, the damper is formed of the grease member, however, it is not limited to the grease member. For example, it may be formed of rubber material such as silicone rubber insofar as it has large internal damping and low elasticity.

As is apparent from the foregoing, according to the light scanning device of this embodiment, the bearing mechanism and the driving mechanism can be provided inside of the reflection mirror 100 which is a rotor, and the yoke mechanism is not required so that the light scanning device can be designed in substantially the same size as the reflection mirror 100. Further, only one bearing is sufficient and no high-performance ball bearing is required so that the number of parts can be reduced.

As a result, the light scanning device 400 can be easily rotated stably at high speed and in addition it is designed to have a simple structure and its cost is reduced.

Next, a third embodiment of the invention will be described with reference to FIG. 4.

Figure 4:
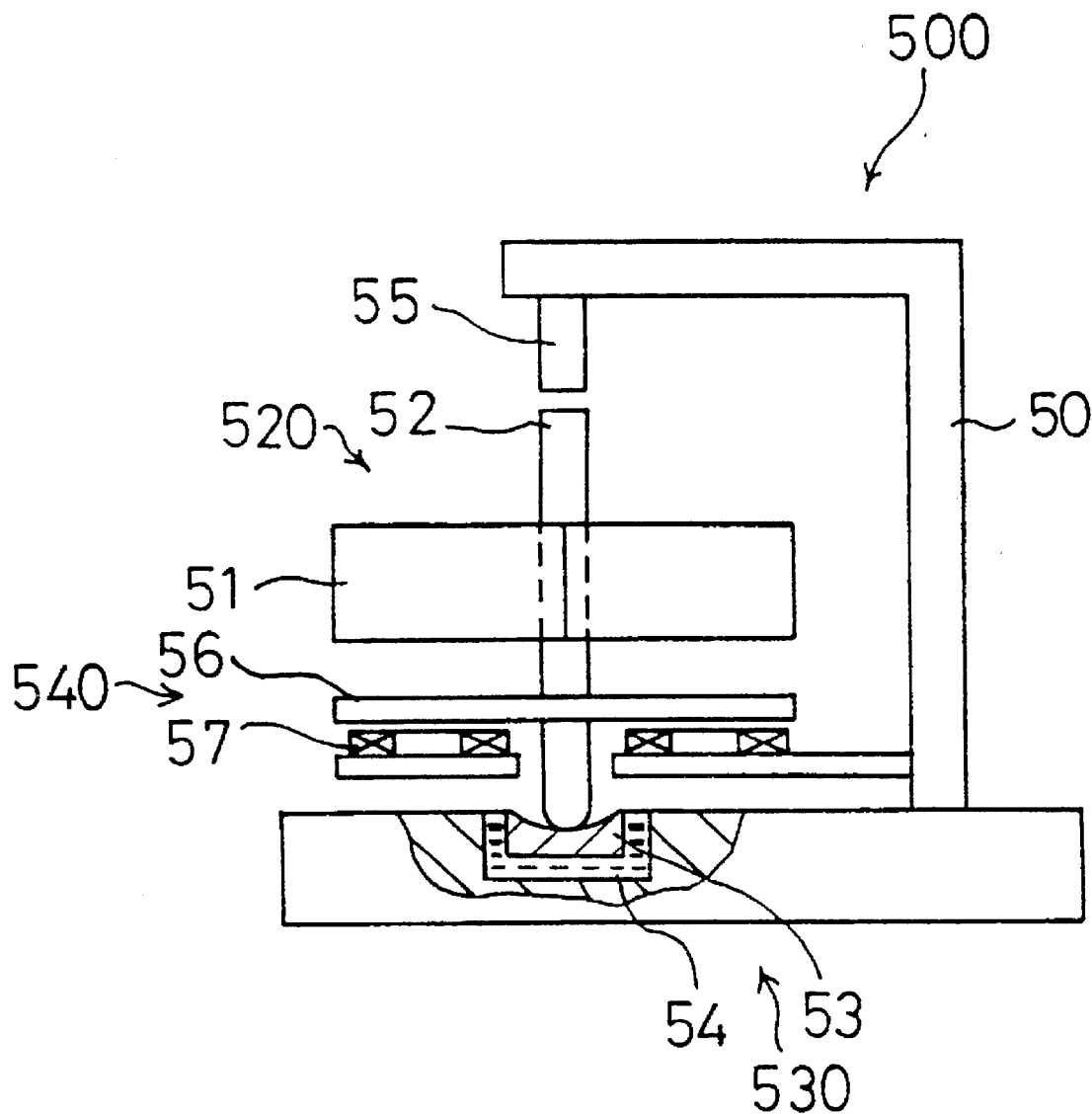
FIG. 4 is a schematic diagram showing the structure of a light scanning device of a third embodiment according to the invention.

In FIG. 4, a light scanning device 500 includes a rotor 520, a bearing device 530 and a motor 540 serving as a driving device. The rotor 520 has a polygonal mirror 51 serving as a reflection mirror and a shaft 52 linked to the center axis of the mirror 51. The lower end of the shaft 52 has a hemispherical or a partial spherical shape.

The bearing device 530 includes a pivot bearing 53 and a damper 54. The damper 54 is formed of a grease material having a high viscosity, that is, high internal resistance, for example. The lower end of the shaft 52 is supported by the pivot bearing 53 and the pivot bearing 53 is connected to the frame 50 through the damper or attenuating member 54.

A suspension permanent magnet 55 for suspending the rotor 520 is secured to the frame 50 at the upper side of the shaft 52 of the rotor 520 so that the rotor 520 stands in the vertical direction.

Further, the shaft 52 is secured to a permanent magnet 56 serving as a rotor of the motor 540 which is the driving device. A stator coil 57 is disposed at a confronting position to the permanent magnet 56. The frame 50 has also a stator yoke function.

By varying the friction force between the lower end of the shaft 52 and the pivot bearing 53, that is, the suspension force of the suspension permanent magnet 55, the bearing stiffness of the bearing device 530 can be set to any value over a wide range of values. In the light scanning device of this embodiment, by setting the suspension force of the suspension permanent magnet 55 to be substantially equal to the dead weight of the rotor 520, the friction force between the lower end of the shaft 52 and the pivot bearing 53 can be reduced to a very small value, so that the bearing stiffness of the bearing device 30 becomes very small. Using this action, in this embodiment the suspension force of the suspension permanent magnet 55 is adjusted so that the rotational frequency of the rotor 520 is equal to about three times the resonance frequency of the rotor 520.

The operation of the rotor 520 of this embodiment is based on the same self-balancing theory as the first and second embodiments as described above and the detailed description thereof is omitted.

In the first, second and third embodiments as described above, a general electrophotographic process for the charging, developing, transferring and fixing operations is used. The effect of this invention can be obtained in any other processes than described above, and the detailed description thereof is also omitted.

The structure of the bearing device is not limited to the structure as described above and various modifications may be made to the above embodiments so long as the bearing device has a very low bearing stiffness.

The structure of the motor for rotationally driving the rotor is not limited to those of the embodiments as described above and various modifications may be made so long as it provides a rotational driving force to the shaft member of the rotor without losing the effect of the invention.

Other modifications may be made to the embodiments as described above without departing from the scope of the invention.

As is apparent from the foregoing, according to the light scanning device, the reflection mirror is supported by the bearing device having a very low bearing stiffness so that the rotor can be rotated around its inertia axis and the whirl amplitude of the rotational axis of the reflection mirror can be greatly suppressed.

In addition, the stiffness of the bearing is very low and, thus, the bearing load force is also small. Accordingly, bearing loss is reduced and this invention is effective to promote the long life and the low power consumption of the driving circuit. Further, because the vibration of the rotor is not forcedly suppressed by the restraining force of the bearing portion, no propagation (leakage) of the vibration or noise to the outside occurs. As a result, this invention can provide a light scanning device in which low-cost, high-speed and long life can be achieved and vibration and noise can be suppressed.

What is claimed is:

1. A light scanning device, comprising:
   reflection means supported by a rotational shaft for reflecting a light beam;
   driving means for conducting a scanning operation of radially reflecting the light beam from the reflection means by rotationally driving the rotational shaft with a stationary rotating number;
   bearing means for rotatably supporting the rotational shaft of the reflection means with such a bearing stiffness that a resonance rotating number of a whirl resonance mode of the rotational shaft of the reflection means is lower than the stationary rotating number of the rotational shaft, wherein the bearing means includes:
   at least one pivot bearing means for rotatably supporting the rotational shaft of the reflection means; and
   a seating means for receiving said at least one pivot bearing means.

2. A light scanning device as claimed in claim 1, wherein the light beam is modulated in accordance with image information corresponding to an image formed by the light beam radially reflected at the reflection means.

3. A light scanning device as claimed in claim 1, wherein the bearing means further includes damping means in said seating means between said seating means and said pivot bearing means for a translational motion of the bearing means in a direction perpendicular to the rotational shaft of the reflection means.

4. A light scanning device as claimed in claim 3, wherein the reflection means is in an inverted cup-shaped form and the pivot bearing means is provided to the ceiling portion of the reflection means.

5. A light scanning device as claimed in claim 4, wherein the light beam is modulated in accordance with image information corresponding to an image formed by the light beam radially reflected by the reflection means.

6. A light scanning device, comprising:
   a frame;
   a rotatable mirror mounted on said frame;
   at least one bearing between said frame and said rotatable mirror for rotatably supporting said rotatable mirror, said bearing having a stiffness such that a resonance rotating number of a whirl resonance mode of the rotatable mirror is at least 50% lower than the stationary rotating number of the rotational shaft; and
   means for rotating said rotatable mirror, wherein said at least one bearing comprises a recess and a pivot bearing seating seated in said recess, said at least one bearing being in one of said frame and said rotatable mirror.

7. The light scanning device as claimed in claim 6, wherein said rotatable mirror comprises:
   an elongated shaft; and
   a polygonal mirror mounted at a mid-point of said elongated shaft.

8. The light scanning device as claimed in claim 7, wherein said frame comprises:
   a first arm; and
   a second arm, said first and second arms opposing one another, and said at least one bearing comprises a first bearing seated in said first arm and a second bearing seated in said second arm, said elongated shaft mounted between said first arm and said second arm.

9. The light scanning device as claimed in claim 8, wherein each surface of both ends of said elongated shaft includes at least a part of a spherical surface.

10. The light scanning device as claimed in claim 8, wherein said first and second bearings each further comprise a damper in a base of said recess, a ring shaped elastic member seated within said recess and said pivot bearing seating within said ring shaped elastic member, said ring shaped elastic member and said pivot bearing seating riding on said damper.

11. The light scanning device as claimed in claim 7, wherein said means for rotating said rotatable mirror comprises:
   a permanent magnet mounted to a surface of said polygonal mirror; and
   a stator coil mounted to said first arm in a position to oppose said permanent magnet.

12. The light scanning device as claimed in claim 6, wherein said frame further comprises an upwardly extending pivot shaft, said rotatable mirror having an inverted cup-shaped configuration with a cylindrical body and a base closing an upper end, said base resting on said upwardly extending pivot shaft.

13. The light scanning device as claimed in claim 12, wherein said at least one bearing is in said base of said rotatable mirror.

14. The light scanning device as claimed in claim 13, wherein said pivot bearing seating is in contact with an upper surface of said upwardly extending pivot shaft and said at least one bearing further comprises a damping portion, said damping portion comprising a grease material in the recess with said pivot bearing seating seated in said damping portion.

15. The light scanning device as claimed in claim 14, wherein the upper surface of said upwardly extending print shaft includes at least a part of a spherical surface.

16. The light scanning device as claimed in claim 13, wherein said means for rotating comprises:

a permanent magnet mounted to an inner surface of said cylindrical portion of said inverted cup-shaped rotatable mirror; and a coil mounted to said upwardly extending pivot shaft in an opposing relationship to said permanent magnet.

17. The light scanning device as claimed in claim 6, wherein said frame comprises:

a base having said recess of said at least one bearing;

an arm;

and a suspension magnet extending from said arm in an opposing relationship to said recess in said base.

18. The light scanning device as claimed in claim 17, wherein said rotatable mirror comprises;

an elongated shaft; and a polygonal mirror mounted to said elongated shaft, wherein a one end of said elongated shaft opposes said suspension magnet and another end of said elongated shaft is received at said at least one bearing.

19. The light scanning device as claimed in claim 18, wherein said at least one bearing further comprises a damper of a grease material in the recess, said pivot bearing seating seated in said damper, said pivot bearing seating receiving the other end of said elongated shaft.

20. The light scanning device as claimed in claim 19, wherein said means for rotating comprises:

a permanent magnet mounted on said elongated shaft between said polygonal mirror and the another end; and a stator coil mounted to said frame in a position to oppose said permanent magnet.

* * * * *